United States Patent
Zamir et al.

(10) Patent No.: US 11,966,630 B2
(45) Date of Patent: Apr. 23, 2024

(54) KEY-TO-PHYSICAL TABLE OPTIMIZATION FOR KEY VALUE DATA STORAGE DEVICES

(71) Applicant: Western Digital Technologies, Inc., San Jose, CA (US)

(72) Inventors: Ran Zamir, Ramat Gan (IL); Alexander Bazarsky, Holon (IL); David Avraham, Even Yehuda (IL)

(73) Assignee: Western Digital Technologies, Inc., San Jose, CA (US)

( * ) Notice: Subject to any disclaimer, the term of this patent is extended or adjusted under 35 U.S.C. 154(b) by 155 days.

(21) Appl. No.: 17/850,423

(22) Filed: Jun. 27, 2022

(65) Prior Publication Data

US 2023/0418514 A1 Dec. 28, 2023

(51) Int. Cl.
*G06F 3/06* (2006.01)
(52) U.S. Cl.
CPC .......... *G06F 3/0656* (2013.01); *G06F 3/0607* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 11,599,412 B1 * | 3/2023 | Agarwala | G06F 11/1076 |
| 2013/0250686 A1 | 9/2013 | Marukame et al. | |
| 2014/0358871 A1 * | 12/2014 | Cideciyan | G06F 3/0608 |
| | | | 707/692 |
| 2016/0171033 A1 | 6/2016 | Konik et al. | |
| 2017/0048352 A1 * | 2/2017 | Imamura | H04L 67/60 |
| 2017/0220572 A1 | 8/2017 | Ding et al. | |
| 2019/0340183 A1 | 11/2019 | Bussler et al. | |
| 2019/0377889 A1 * | 12/2019 | Mertens | G06F 21/60 |
| 2020/0125410 A1 | 4/2020 | Karmarkar et al. | |
| 2020/0159859 A1 * | 5/2020 | Beckman | G06F 3/067 |

(Continued)

OTHER PUBLICATIONS

Kim, et al., The Key to Value: Understanding the NVMe Key-Value Standard, Live Website, Sep. 1, 2020, SNIA NSF, Networking Storage, 31 pp.

(Continued)

*Primary Examiner* — Sean D Rossiter
(74) *Attorney, Agent, or Firm* — PATTERSON + SHERIDAN, LLP (57) ABSTRACT

A data storage device includes a memory device and a controller coupled to the memory device. The controller is configured to segment a key to physical (K2P) table into two or more segments, wherein each segment of the two or more segments corresponds to a caching priority of key value (KV) pair data, organize the K2P table by storing and relocating one or more K2P table entries into a respective segment of the two or more segments, wherein the storing and relocating comprises moving a K2P table entry based on the caching priority of the KV pair data into the respective segment having the caching priority, and utilize the K2P table to manage KV pair data stored in the memory device, wherein utilizing the K2P table comprises applying a same management operation, such as prefetching, to each K2P table entry of a same segment.

20 Claims, 6 Drawing Sheets

(56) References Cited

U.S. PATENT DOCUMENTS

2020/0162101 A1\* 5/2020 Beckman .............. G06F 3/0613
2021/0081417 A1\* 3/2021 Chavan .............. G06F 16/2456

OTHER PUBLICATIONS

Adams, NVMe® Base Specification 2.0 Preview, Flash Memory Summit, 2020, NVM Express organization, 20 pp.
Samsung Key Value SSD Enables High Performance Scaling, A Technology Brief by Samsung Memory Solutions Lab, Samsung Electronics, Co. Ltd., 2017, 8 pp.
Martin, et al., NVM Express Technical Proposal for New Feature, Jun. 2020, NVM Express, Inc., 34 pp.

\* cited by examiner

FIG. 1

| KEY 202 |
|---|
| VALUE 204 |

FIG. 2A

| COMMAND | DESCRIPTION |
|---|---|
| DELETE | DELETE THE KEY AND VALUE ASSOCIATED WITH SPECIFIED KEY |
| LIST | LISTS KEYS THAT EXIST IN A KEY VALUE NAMESPACE STARTING AT A SPECIFIED KEY |
| RETRIEVE | RETRIEVE THE VALUE ASSOCIATED WITH A SPECIFIED KEY |
| EXIST | RETURNS A STATUS INDICATING WHETHER A KEY VALUE EXISTS FOR A SPECIFIED KEY |
| STORE | STORES A KEY VALUE TO A KEY VALUE NAMESPACE |

KEY-TO-PHYSICAL TABLE OPTIMIZATION FOR KEY VALUE DATA STORAGE DEVICES

BACKGROUND OF THE DISCLOSURE

Field of the Disclosure

Embodiments of the present disclosure generally relate to data storage devices, such as solid state drives (SSDs), and, more specifically, optimizing storage of key-to-physical (K2P) tables in key value (KV) data storage devices.

Description of the Related Art

A KV database works by storing a quantity of user data that is associated with a key that is addressable as a complete entity. Examples of user data that can be stored in a KV database may include photos, records, and files. From a host device point-of-view, the photo, the record, or the file may be retrieved using a single key/address, rather than using multiple addresses that include data of the photo, the record, or the file. The data is stored as unstructured data and may be addressed using a key of variable length. Storage space of a memory device may be allocated for KV pair data in increments of bytes, where a length value of the KV pair data is associated with the necessary storage space to store the KV pair data.

Using a KV database in a data storage device may increase the performance of the data storage device. For example, the number of data transfers/second may be improved because the KV pair data to physical storage location translation layer in the host device may be removed. Furthermore, the number of commands over the bus may be reduced since an entire KV pair data may utilize a single transfer. KV pair data allows access to data on a data storage device using a key rather than a block address. One of the main differences between a key value data storage device and a conventional data storage device is that the data is organized into KV pairs. The logical to physical (L2P) table of the conventional data storage device is replaced by a key to physical (K2P) table, where the K2P table may be about $\frac{1}{1000}$ of the size of the data storage device, which may be too large to hold in a random access memory (RAM) of the data storage device. In some examples, the data storage device may include both a K2P table and an L2P table. The K2P table is a table or tables that includes physical locations of the data associated with each KV pair data (i.e., the value of the KV pair data). Because the KV database may have different formats, storage and organization of the K2P table may be non-optimized.

Therefore, there is a need in the art to manage and optimize the management of the K2P table.

SUMMARY OF THE DISCLOSURE

The present disclosure generally relates to data storage devices, such as solid state drives (SSDs), and, more specifically, optimizing storage of key-to-physical (K2P) tables in key value (KV) data storage devices. A data storage device includes a memory device and a controller coupled to the memory device. The controller is configured to segment a key to physical (K2P) table into two or more segments, wherein each segment of the two or more segments corresponds to a caching priority of key value (KV) pair data, organize the K2P table by storing and relocating one or more K2P table entries into a respective segment of the two or more segments, wherein the storing and relocating comprises moving a K2P table entry based on the caching priority of the KV pair data into the respective segment having the caching priority, and utilize the K2P table to manage KV pair data stored in the memory device, wherein utilizing the K2P table comprises applying a same management operation, such as prefetching, to each K2P table entry of a same segment.

In one embodiment, a data storage device includes a memory device and a controller coupled to the memory device. The controller is configured to segment a key to physical (K2P) table into two or more segments, wherein each segment of the two or more segments corresponds to a caching priority of key value (KV) pair data, organize the K2P table by storing and relocating one or more K2P table entries into a respective segment of the two or more segments, wherein the storing and relocating comprises moving a K2P table entry based on the caching priority of the KV pair data into the respective segment having the caching priority, and utilize the K2P table to manage KV pair data stored in the memory device, wherein utilizing the K2P table comprises applying a same management operation to each KV pair data of a same segment.

In another embodiment, a data storage device includes a memory device and a controller coupled to the memory device. The controller is configured to receive a read command for key value (KV) pair data stored in the memory device, access a key to physical (K2P) table for a K2P entry corresponding to the KV pair data, retrieve the K2P entry, and prefetch one or more other K2P entries, wherein the K2P entry and the one or more other K2P entries are in a same segment of two or more segments of the K2P table, wherein each segment of the two or more segments of the K2P table corresponds to a caching priority of KV pair data.

In another embodiment, a data storage device includes memory means and a controller coupled to the memory means. The controller is configured to cluster one or more key to physical (K2P) entries in a K2P table based on a key value (KV) format of a KV pair data, a size of the KV pair data, a read frequency of the KV pair data, a read likelihood of an another KV pair data to be read after reading the KV pair data, and a relative performance of the KV pair data, and prefetch the one or more K2P entries in response to receiving a read command for a K2P entry of the one or more K2P entries.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, optimizing storage of key-to-physical (K2P) tables in key value (KV) data storage devices. A data storage device includes a memory device and a controller coupled to the memory device. The controller is configured to segment a key to physical (K2P) table into two or more segments, wherein each segment of the two or more segments corresponds to a caching priority of key value (KV) pair data, organize the K2P table by storing and relocating one or more K2P table entries into a respective segment of the two or more segments, wherein the storing and relocating comprises moving a K2P table entry based on the caching priority of the KV pair data into the respective segment having the caching priority, and utilize the K2P table to manage KV pair data stored in the memory device, wherein utilizing the K2P table comprises applying a same management operation, such as prefetching, to each K2P table entry of a same segment.

Figure 1:
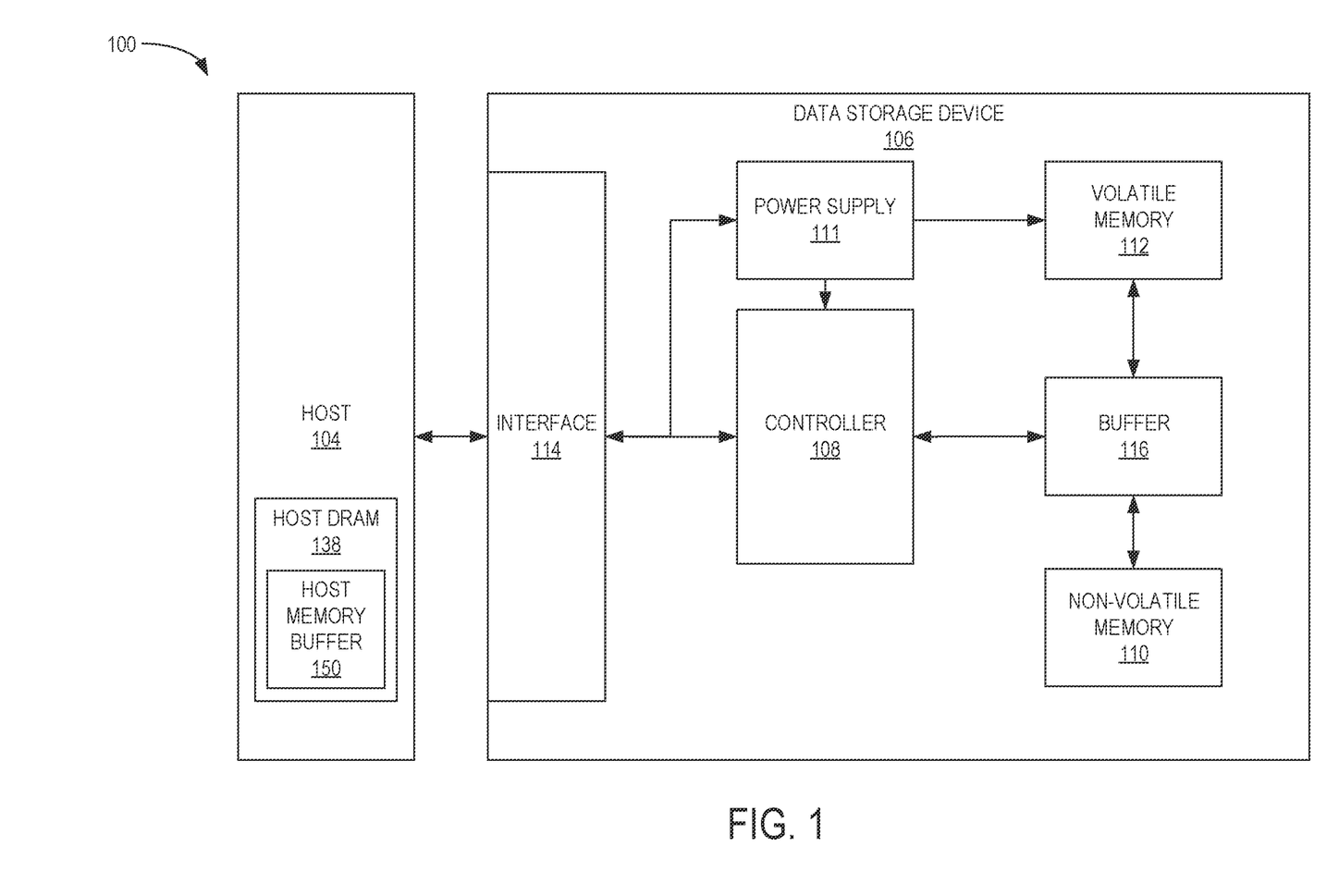
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108, which may be SRAM memory, prior to sending the data to the NVM 110.

Furthermore, the host device 104 may allocate a portion of the host DRAM 138 to the controller 108, where the portion of the host DRAM 138 allocated to the controller 108 is the host memory buffer (HMB) 150. The HMB 150 may be a portion of the host DRAM 138 that is exclusively used by the controller 108. The controller 108 may store data in the HMB 150 in lieu of storing data in the volatile memory 112, the buffer 116, or an internal memory of the controller 108, such as SRAM. For example, translation tables, such as logical to physical (L2P) tables and key to physical (K2P) tables, may be stored in the HMB 150, where the translation tables includes entries that map either a logical block address (LBA) or a key to a corresponding physical block address (PBA). In some examples when the HMB 150 is present, the data storage device 106 may be DRAM-less.

Figure 2A:
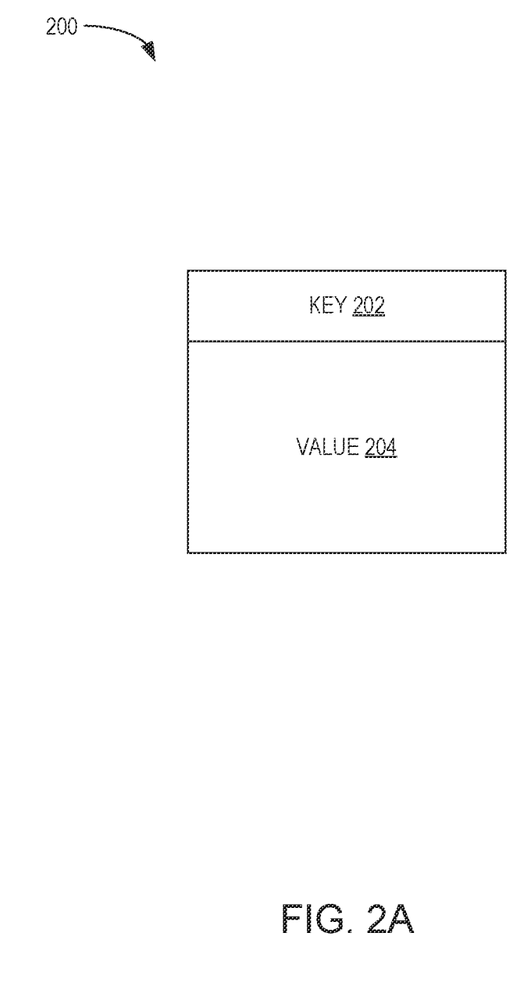
FIG. 2A is an exemplary illustration of a KV pair data, according to certain embodiments.

FIG. 2A is an exemplary illustration of a KV pair data 200, according to certain embodiments. KV pair data 200 includes a key 202 and a value 204, where the data, which may be host data, of the value 204 is addressed by the key 202. The key 202 may have a size of about 1 byte to about 64 bytes and the value 204 may have a size of about 0 bytes to about $2^{32}-1$ bytes. For example, when the value 204 has a size of about 0 bytes, the value 204 is an empty value. It is to be understood that the previously mentioned values are not intended to be limiting, but to provide an example of an embodiment.

Figure 2B:
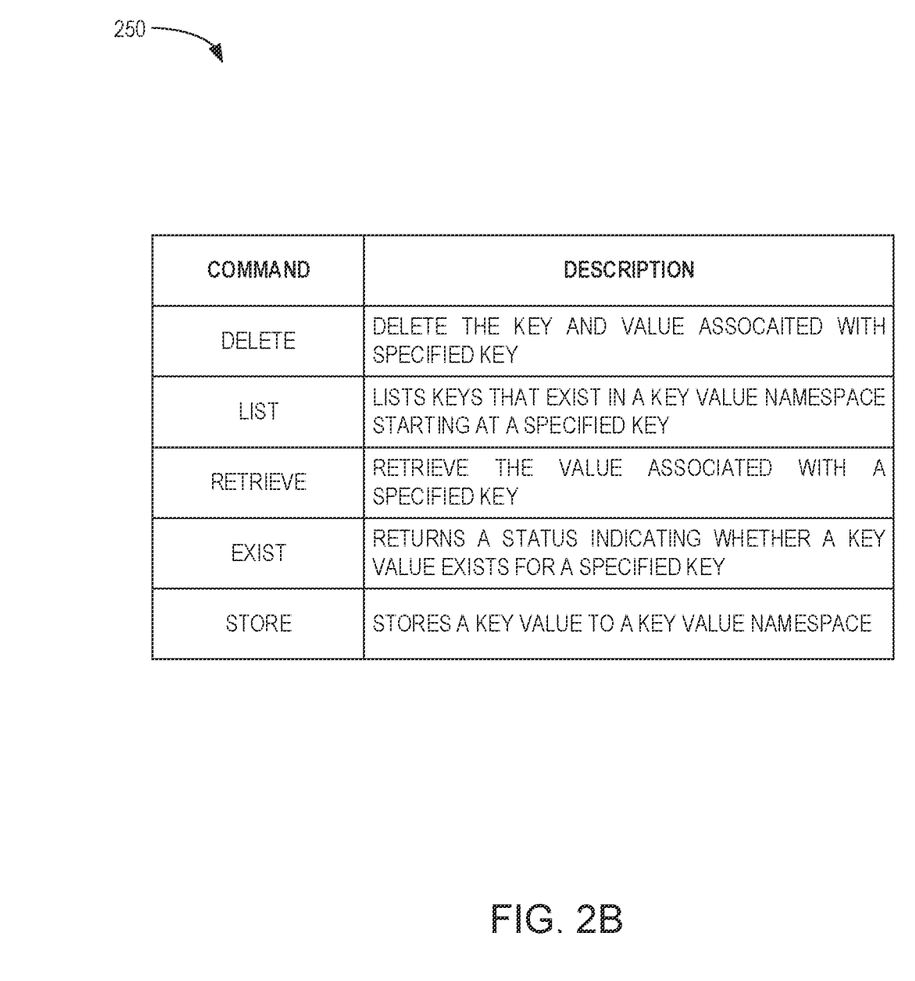
FIG. 2B is a table illustrating a command set for a KV database, according to certain embodiments.

FIG. 2B is a table 250 illustrating a command set for a KV database, according to certain embodiments. For exemplary purposes, aspects of the storage system 100 of FIG. 1 may be referenced herein. A KV system may include a command set that includes, in a non-limiting list, a delete command, a list command, a retrieve command, an exist command, and a store command. The delete command may cause the controller 108 to delete the key 202 and value 204 associated with the key 202. The list command may cause the controller 108 to list keys that exist in a KV namespace starting at a specified key. The exist command may cause the controller 108 to return a status indicating whether a KV pair data 200 exists for a specified key to the command generator, such as the host device 104. The store command may cause the controller 108 to store a KV pair data to a KV namespace.

The retrieve command may cause the controller 108 to retrieve the value 204 associated with a specified key from a KV namespace. The length to be retrieved of the KV pair data 200 is specified in the retrieve command and the location to transfer the KV pair data 200 is specified by either a scatter gather list (SGL) pointer or a physical region page (PRP) pointer in the retrieve command. If the specified length in the retrieve command is less than the length of the KV pair data 200 that is being retrieved, then the controller 108 returns the requested amount and the length of the KV pair data 200 to the completion queue. However, if the specified length in the retrieve command is greater than the length of the KV pair data 200 that is being retrieved, then the controller 108 returns the data from the NVM 110 and the length of the KV pair data 200 is returned to the completion queue.

In the KV system, there may be one or more KV formats present, each with a different set of KV sizes and properties. For example, a KV format may refer to a value length of the KV data. The value length may correspond to a type of the host object. For example, large objects, such as large videos, data files, images, music, documents, and the like, may have a size of a few megabytes and smaller objects, such as leaves in larger data structures, log entries, social media applications, internet of things (IoT) services, and the like, may have a size in the tens of bytes. A flash management unit (FMU) size may be driven by different constraints according to the type and amount of error correction code (ECC) used and the physical memory parameters. A plurality of KV pair data that has a smaller value length, where the value length is less than an FMU size, may be grouped and aggregated to the FMU. For example, if a KV pair data has a value length of about 50 bytes and an FMU size is equal to about 4 KB, then about 80 KV pair data having a value length of about 50 bytes each may be stored in each FMU. Therefore, hundreds of KV pair data having a value length of about 50 bytes may be stored in each wordline.

In the KV system, there may be one or more KV formats present, each with a different set of KV sizes and properties. Furthermore, each KV format may have a relative performance (RP) requirement which may dictate where the KV pair data is stored in the NVM 110. It is to be understood that the term "requirement" may refer to a general guideline, such that the controller 108 may attempt to program KV pair data in the RP specified wordlines or blocks, but may also program the KV pair data in adjacent RP groups to the RP requirement. Blocks of the NVM 110 may be classified according to conditions that relate to the health of the block. For example, conditions relating to the health of the block may include, but not limited to, a number of program erase cycles (PEC), a bit error rate (BER) severity, a physical location of a wordline on the block, and an amount of time exceeding a temperature threshold or thresholds. Wordlines near an edge of the block may exhibit higher BER than wordlines near the middle of the block.

Therefore, blocks and/or wordlines of the blocks may be logically grouped into performance groups. For example, there may be four groups where a first group has the highest performance, a second group has a performance lower than the first group, a third group has a performance lower than the second group, and a fourth group has a performance lower than the third group. An example of RP values is shown in Table 1 below.

TABLE 1

| Value | Definition |
|---|---|
| 00b | Best Performance |
| 01b | Better Performance |
| 10b | Good Performance |
| 11b | Degraded Performance |

Figure 3:
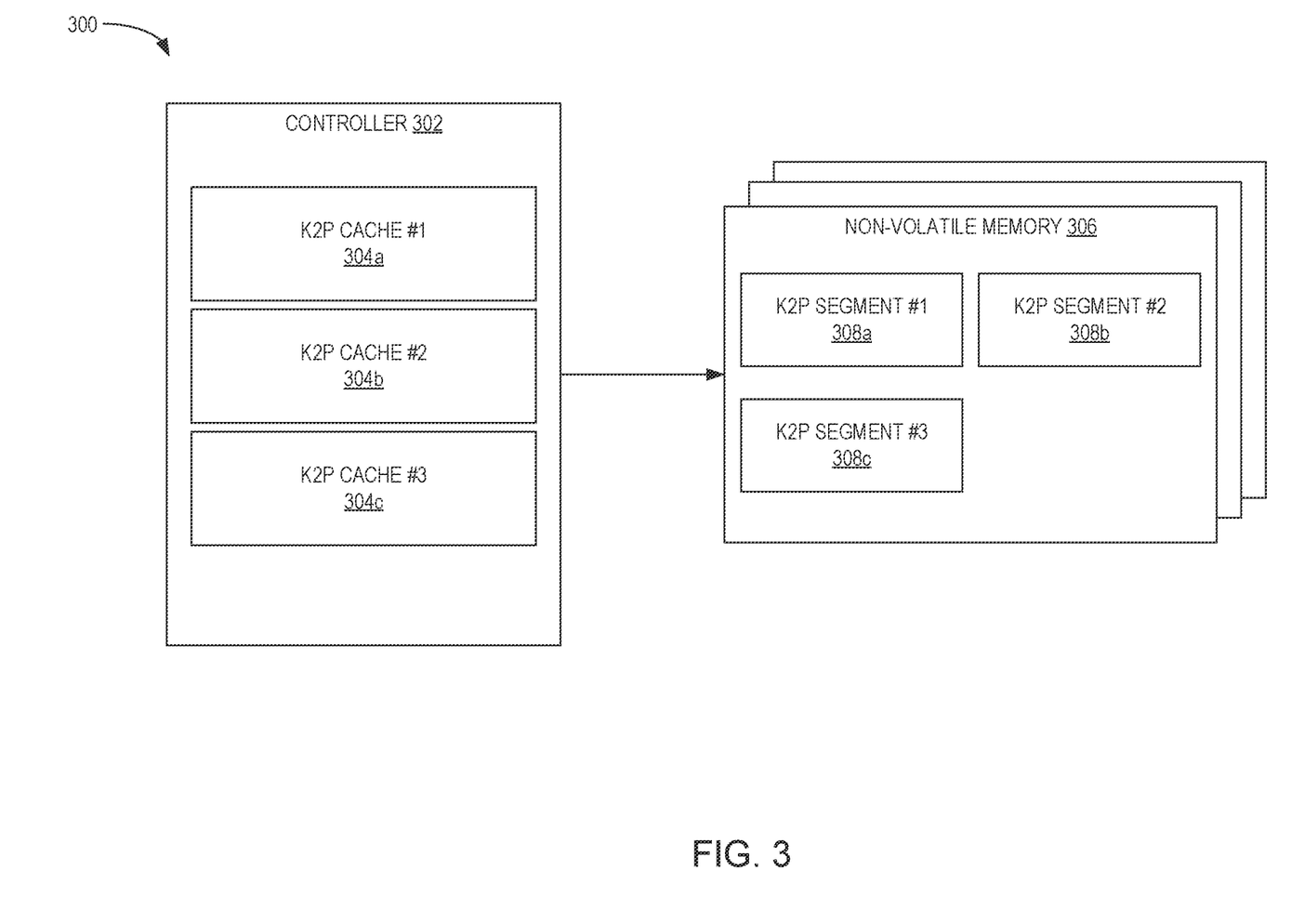
FIG. 3 is an exemplary illustration of a cache management segmentation according to relative performance (RP), according to certain embodiments.

FIG. 3 is an exemplary illustration of a cache management segmentation 300 according to relative performance (RP), according to certain embodiments. Aspects of the storage system 100 of FIG. 1 or FIG. 3 may be referenced herein for exemplary purposes. A key to physical (K2P) table is the equivalent of a logical to physical (L2P) table in conventional data storage devices that holds a logical block address to physical block address mapping. The K2P table may be quite large, such as about ⅟1000 of a capacity of the data storage device 106. For example, when the data storage device 106 has a capacity of about 1 TB, then the K2P table may be a size of about 1 GB. Because of the large size of the K2P table, a controller 302 may opt to store the K2P table in the HMB 150 rather than in an internal volatile memory of the controller 302, such as SRAM, or DRAM coupled to the controller 108. In some examples, the data storage device 106 may be DRAM-less, such that the K2P table may be stored either in the HMB 150 or the NVM 306. Thus, for each read request by the host device 104, the controller 302 may perform a "control" read to fetch the relevant K2P entry from the K2P table stored in either the HMB 150 or the NVM 306 in order to retrieve the relevant mapping associated with the read request.

The controller 302 may segment the K2P table into two or more segments and apply different caching priorities to each segment. For example, the controller 302 may include a first K2P cache 304a, a second K2P cache 304b, and a third K2P cache 304c, where each K2P cache 304a-304c corresponds to a different caching priority. The first K2P cache 304a is associated with an RP corresponding to "best performance". The second K2P cache 304b is associated with an RP corresponding to "better performance". The third K2P cache 304c is associated with an RP corresponding to "good performance". It is to be understood that the shown number of K2P caches is not intended to be limiting, but to provide an example of a possible embodiment.

Furthermore, each K2P cache 304a-304c of the controller 302 is associated with a stored K2P segment stored in the NVM 306. In some examples, the stored K2P segments may be stored in HMB 150. Therefore, the first K2P cache 304a is associated with a first K2P segment 308a, the second K2P cache 304b is associated with a second K2P segment 308b, and a third K2P cache 304c is associated with a third K2P segment 308c. In some examples, segments having a higher caching priority may be stored in an internal memory of the controller 302, such as SRAM, and segments having a lower caching priority may be stored in HMB or the NVM 306. For example, the first K2P segment 308a may be stored in an internal memory of the controller 302, such as SRAM, and the second and third K2P segments 308b, 308c may be stored in the NVM 306 or the HMB 150. In some examples, the controller 302 may utilize little to no prefetching for the lower caching priority segments when a related KV pair data is requested to be read.

The K2P caches 304a-304c may be used to prefetch similar data, where similar data is data that the controller 302 is predicting to be read next or soon. For example, when the controller 302 receives a read request for KV pair data associated with the first K2P cache 304a, the controller 302 may prefetch one or more other mappings associated with KV pair data having mapping stored in the first K2P cache 304a. Therefore, when the controller 302 receives a next read request for another KV pair data associated with the first K2P cache 304a, the mapping is already stored in a local memory to be used to complete the read request. Thus, by segmenting the K2P table and applying different caching priorities, the performance of the data storage device when executing read requests may be improved and the available resources may be better utilized.

Figure 4:
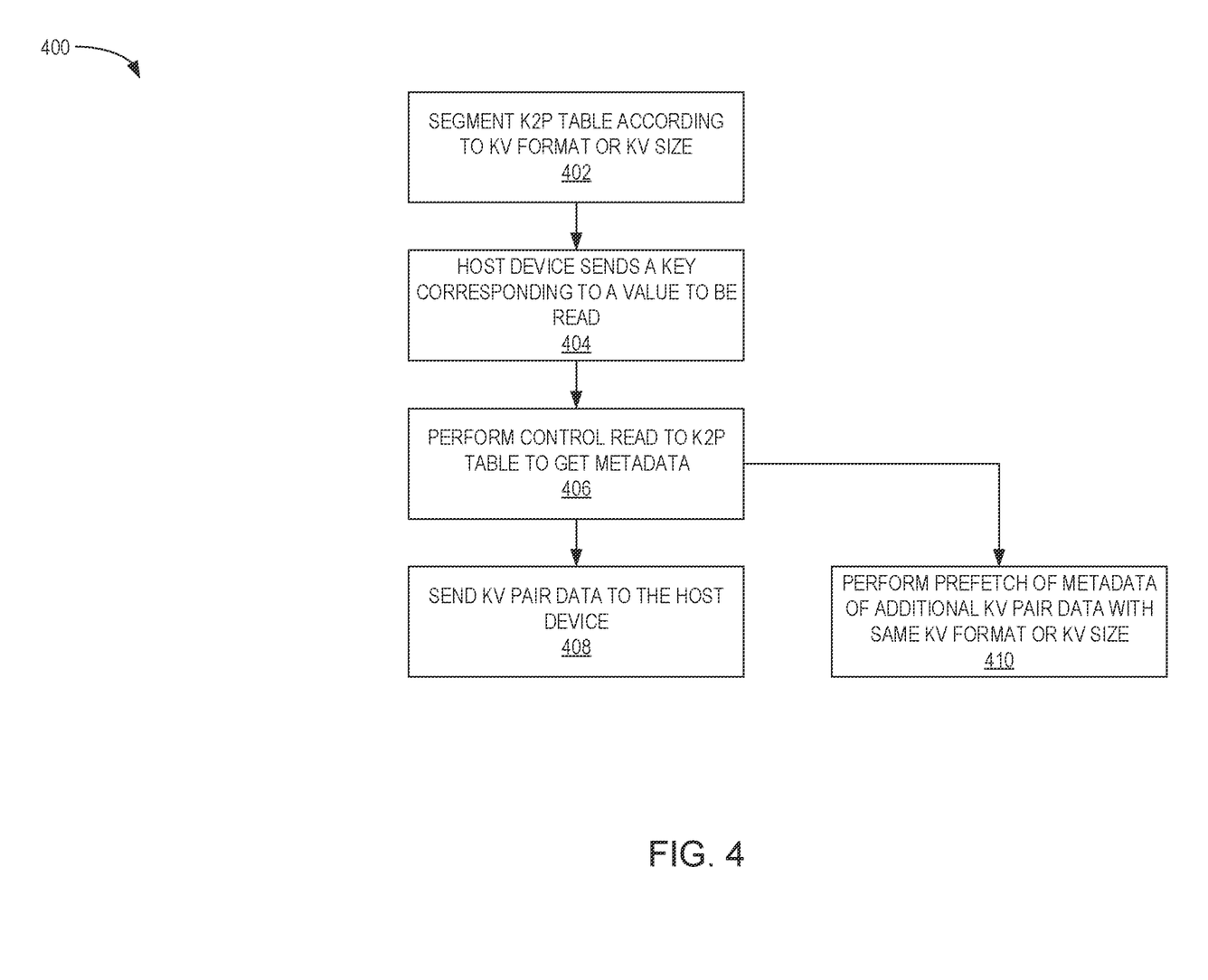
FIG. 4 is a flow diagram illustrating a method of prefetching, according to certain embodiments.

FIG. 4 is a flow diagram illustrating a method 400 of prefetching, according to certain embodiments. Aspects of the storage system 100 of FIG. 1 may be referenced herein for exemplary purposes. Method 400 may be implemented by a controller, such as the controller 108 of FIG. 1 or the controller 302 of FIG. 3. The prefetching of K2P entries may be completed based on a KV format or a KV size that matches a KV format or a KV size of a current read request. For example, when the host device 104 requests a certain value using a key, the controller 302 may initiate additional control reads to retrieve relevant K2P entries that share a same KV format or a KV size as the requested value. The KV formats and the KV sizes may be stored together based on a similarity matrix. For example, KV formats and KV sizes that are more closely related may be stored closer to each other or have pointers pointing to each other and KV formats and KV sizes that are more less related may be stored further from each other. Because there is a strong correlation of same KV formats or KV sizes being read together, K2P entries corresponding to the same KV formats or KV sizes may be stored together.

At block 402, the controller 302 segments the K2P table into two or more segments according to KV format or KV size. At block 404, the host device 104 sends a key corresponding to a value to be read to the controller 302. At block 406, the controller 302 performs a control read on the K2P table to retrieve the metadata (i.e., K2P entry) associated with the value to be read. At block 408, the KV pair data associated the requested value to be read is sent to the host device 104. After performing the control read to retrieve the relevant metadata, the controller 302 may prefetch metadata of additional KV pair data with a same KV format or KV size as the requested value to be read at block 410. The prefetched metadata may be stored in an internal volatile memory of the controller 108, such as SRAM, in the buffer 116, or the volatile memory 112.

Figure 5:
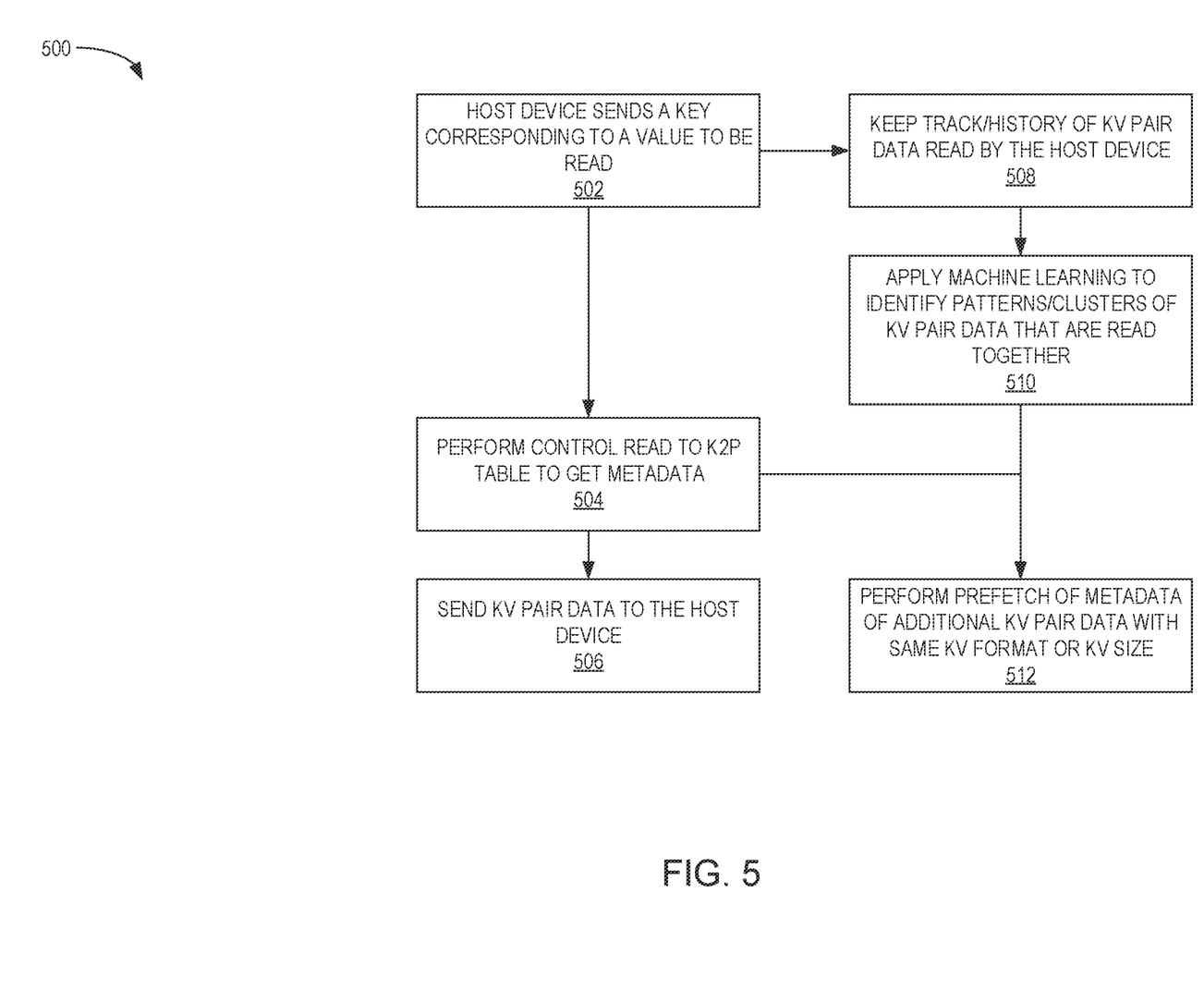
FIG. 5 is a flow diagram illustrating a method of prefetching according to learned KV association, according to certain embodiments.

FIG. 5 is a flow diagram illustrating a method 500 of prefetching according to learned KV association, according to certain embodiments. Aspects of the storage system 100 of FIG. 1 or FIG. 3 may be referenced herein for exemplary purposes. Using method 500, the controller 302 may try to learn the patterns in which the host device 104 sends read requests for the KV pair data. Based on the patterns, the controller 302 may cluster the KV pair data into groups that are usually read together, which may include clustering the respective K2P entries together in the K2P table. Thus, when the host device 104 sends a read request for a value, the controller 302 may prefetch the metadata of associated values in the same cluster as the metadata of the requested value.

At block 502, the host device 104 sends a key corresponding to a value to be read to the controller 302. At block 504, the controller 302 performs a control read on the K2P table to retrieve the metadata (i.e., K2P entry) associated with the value to be read. At block 506, the KV pair data associated the requested value to be read is sent to the host device 104. After receiving the key corresponding to a value to be read from the host device 104 at block 502, the controller 302 updates a history of the requested KV pair data to keep track of which KV pair data has been requested by the host device 104 at block 508. The controller 108 applies machine learning or any other data optimization method to identify patterns or clusters of KV pair data that are read together at block 510. After performing the control read to retrieve the relevant metadata, the controller 302 may prefetch metadata, including the K2P entry indicating the physical locations of the data of the KV pair data (i.e., the value) of additional KV pair data with a same KV format or KV size as the requested value to be read at block 512. The prefetched metadata may be stored in an internal volatile memory of the controller 108, such as SRAM, in the buffer 116, or the volatile memory 112.

Figure 6:
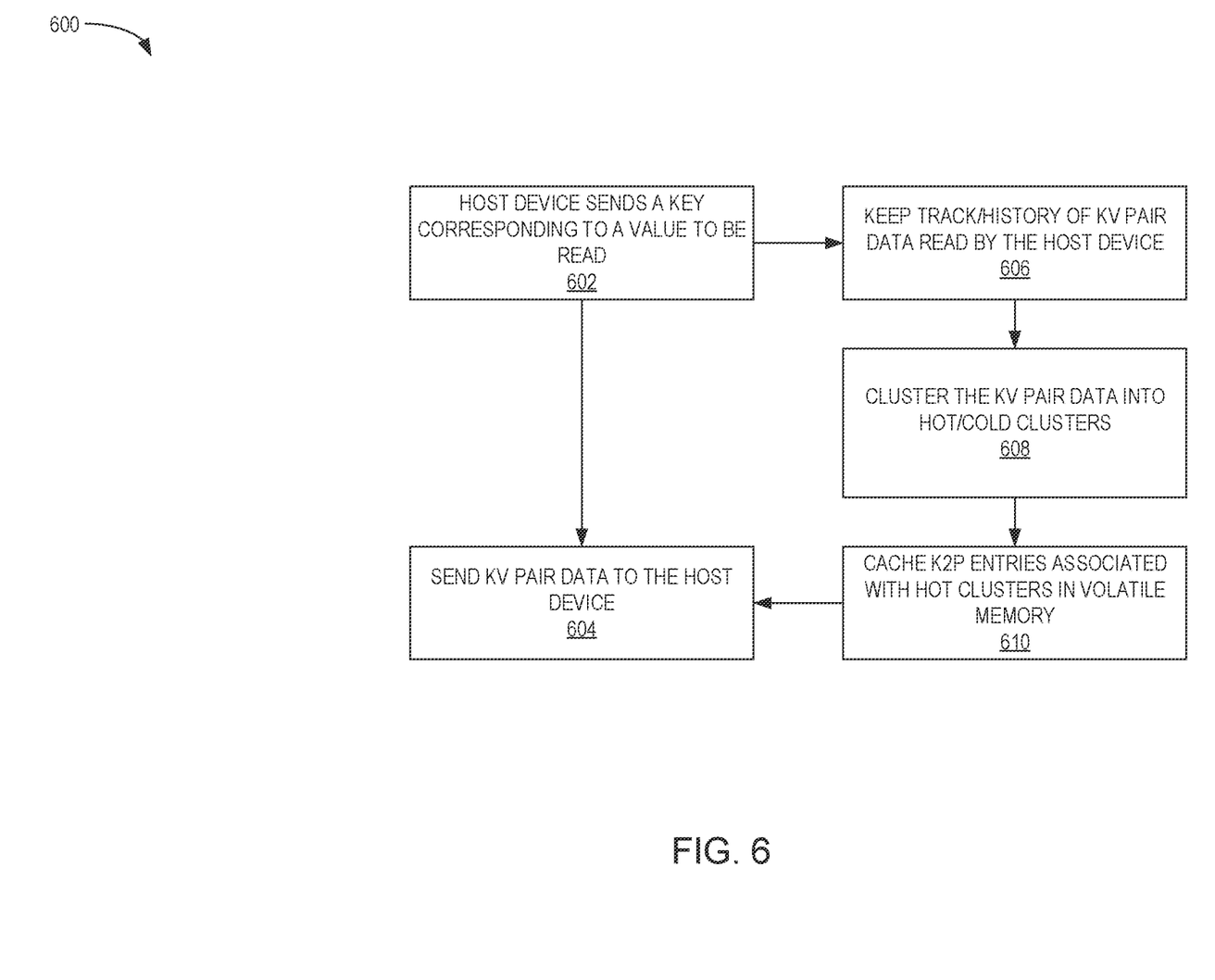
FIG. 6 is a flow diagram illustrating a method of K2P hot/cold KV data pair data caching, according to certain embodiments.

FIG. 6 is a flow diagram illustrating a method 600 of K2P hot/cold KV data pair data caching, according to certain embodiments. Aspects of the storage system 100 of FIG. 1 or FIG. 3 may be referenced herein for exemplary purposes. Using method 600, the controller 302 may cluster KV pair data together based on a read frequency of the KV pair data, where the clustering includes clustering the relevant K2P entries together in the K2P table. For example, KV pair data that is read or accessed greater than about 50% of the time may be considered as hot data and KV pair data that is read or accessed less than about 50% of the time may be considered as cold data. Thus, read performance on the most common read KV pair data may be improved.

At block 602, the host device 104 sends a key corresponding to a value to be read to the controller 302. At block 604, the KV pair data associated the requested value to be read is sent to the host device 104, which may include additional control reads if the relevant K2P mapping is not cached. After receiving the key corresponding to a value to be read from the host device 104 at block 602, the controller 302 updates a history of the requested KV pair data to keep track of which KV pair data has been requested by the host device 104 at block 606. At block 608, the controller 302 clusters the KV pair data, which may include the respective K2P entries in the K2P table, into hot/cold clusters based on a read frequency of the KV pair data. At block 610, the controller 302 caches the K2P entries associated with the hot clusters in volatile memory, which may be an internal volatile memory of the controller 302, such as SRAM, the volatile memory 112, or the buffer 116.

By optimizing the management of the K2P tables in a KV data storage device, read performance may be improved.

In one embodiment, a data storage device includes a memory device and a controller coupled to the memory device. The controller is configured to segment a key to physical (K2P) table into two or more segments, wherein each segment of the two or more segments corresponds to a caching priority of key value (KV) pair data, organize the K2P table by storing and relocating one or more K2P table entries into a respective segment of the two or more segments, wherein the storing and relocating comprises moving a K2P table entry based on the caching priority of the KV pair data into the respective segment having the caching priority, and utilize the K2P table to manage KV pair data stored in the memory device, wherein utilizing the K2P table comprises applying a same management operation to each KV pair data of a same segment.

The data storage device is coupled to a host device. The K2P table is stored in a host memory buffer (HMB). The data storage device is dynamic random access memory-less (DRAM-less). The caching priority is based on a relative performance value of the KV pair data. Each of the two or more segments is associated with a different relative performance value. The relative performance is either a first relative performance or a second relative performance, wherein the second relative performance has a lower performance requirement than the first relative performance. The caching priority is based on a KV format of the KV pair data. Each of the two or more segments is associated with a different KV format. The KV format corresponds to a size of the KV pair data. The caching priority is based on a grouping corresponding to KV pair data expected to be read together. Each of the two or more segments is associated with a different grouping. The controller is further configured to generate the grouping based on a pattern of keys associated with received read commands. The caching priority is based on a read frequency of the KV pair data. A first segment of the two or more segments is associated with hot KV pair data and a second segment of the two or more segments is associated with cold KV pair data. The hot KV pair data is read a greater number of times than the cold KV pair data. The same management operation comprises pre-fetching and allocation of resources of the data storage device.

In another embodiment, a data storage device includes a memory device and a controller coupled to the memory device. The controller is configured to receive a read command for key value (KV) pair data stored in the memory device, access a key to physical (K2P) table for a K2P entry corresponding to the KV pair data, retrieve the K2P entry, and prefetch one or more other K2P entries, wherein the K2P entry and the one or more other K2P entries are in a same segment of two or more segments of the K2P table, wherein each segment of the two or more segments of the K2P table corresponds to a caching priority of KV pair data.

The controller is configured to use the prefetched one or more other K2P entries on a subsequently received read command, wherein the subsequently received read command is for another KV pair data, and wherein the another KV pair data corresponds to one of the prefetched one or more other K2P entries. A plurality of KV pair data associated with the prefetched one or more other K2P entries has either a same KV format as the KV pair data or a same size as the KV pair data. The same segment comprises a plurality of K2P entries that are clustered together. The plurality of K2P entries corresponds to KV pair data that are read together. The same segment comprises a plurality of K2P entries that are clustered together. The plurality of K2P entries correspond to KV pair data that is associated with greater than about 50% of a plurality of received read commands. The plurality of K2P entries are stored in a cache of the data storage device.

In another embodiment, a data storage device includes memory means and a controller coupled to the memory means. The controller is configured to cluster one or more key to physical (K2P) entries in a K2P table based on a key value (KV) format of a KV pair data, a size of the KV pair data, a read frequency of the KV pair data, a read likelihood of an another KV pair data to be read after reading the KV pair data, and a relative performance of the KV pair data, and prefetch the one or more K2P entries in response to receiving a read command for a K2P entry of the one or more K2P entries.

The data storage device is dynamic random access memory-less (DRAM-less). The K2P table is stored in a host memory buffer (HMB) of a host device coupled to the data storage device.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
segment a key to physical (K2P) table into two or more segments, wherein each segment of the two or more segments corresponds to a caching priority of key value (KV) pair data;
organize the K2P table by storing and relocating one or more K2P table entries into a respective segment of the two or more segments, wherein the storing and relocating comprises moving a K2P table entry based on the caching priority of the KV pair data into the respective segment having the caching priority; and
utilize the K2P table to manage KV pair data stored in the memory device, wherein utilizing the K2P table comprises applying a same management operation to each KV pair data of a same segment.

2. The data storage device of claim 1, wherein the data storage device is coupled to a host device, and wherein the K2P table is stored in a host memory buffer (HMB).

3. The data storage device of claim 2, wherein the data storage device is dynamic random access memory-less (DRAM-less).

4. The data storage device of claim 1, wherein the caching priority is based on a relative performance value of the KV pair data, and wherein each of the two or more segments is associated with a different relative performance value.

5. The data storage device of claim 4, the relative performance is either:
a first relative performance; or
a second relative performance, wherein the second relative performance has a lower performance requirement than the first relative performance.

6. The data storage device of claim 1, wherein the caching priority is based on a KV format of the KV pair data, and wherein each of the two or more segments is associated with a different KV format.

7. The data storage device of claim 6, wherein the KV format corresponds to a size of the KV pair data.

8. The data storage device of claim 1, wherein the caching priority is based on a grouping corresponding to KV pair data expected to be read together, and wherein each of the two or more segments is associated with a different grouping.

9. The data storage device of claim 8, wherein the controller is further configured to generate the grouping based on a pattern of keys associated with received read commands.

10. The data storage device of claim 1, wherein the caching priority is based on a read frequency of the KV pair data.

11. The data storage device of claim 10, wherein a first segment of the two or more segments is associated with hot KV pair data and a second segment of the two or more segments is associated with cold KV pair data, and wherein the hot KV pair data is read a greater number of times than the cold KV pair data.

12. The data storage device of claim 1, wherein the same management operation comprises pre-fetching and allocation of resources of the data storage device.

13. A data storage device, comprising:
a memory device; and
a controller coupled to the memory device, wherein the controller is configured to:
receive a read command for key value (KV) pair data stored in the memory device;
access a key to physical (K2P) table for a K2P entry corresponding to the KV pair data;
retrieve the K2P entry; and prefetch one or more other K2P entries, wherein the K2P entry and the one or more other K2P entries are in a same segment of two or more segments of the K2P table, wherein each segment of the two or more segments of the K2P table corresponds to a caching priority of KV pair data.

14. The data storage device of claim 13, wherein the controller is configured to use the prefetched one or more other K2P entries on a subsequently received read command, wherein the subsequently received read command is for another KV pair data, and wherein the another KV pair data corresponds to one of the prefetched one or more other K2P entries.

15. The data storage device of claim 13, wherein a plurality of KV pair data associated with the prefetched one or more other K2P entries has either:
  a same KV format as the KV pair data; or
  a same size as the KV pair data.

16. The data storage device of claim 13, wherein the same segment comprises a plurality of K2P entries that are clustered together, wherein the plurality of K2P entries corresponds to KV pair data that are read together.

17. The data storage device of claim 13, wherein the same segment comprises a plurality of K2P entries that are clustered together, and wherein the plurality of K2P entries correspond to KV pair data that is associated with greater than about 50% of a plurality of received read commands.

18. The data storage device of claim 17, wherein the plurality of K2P entries are stored in a cache of the data storage device.

19. A data storage device, comprising:
  memory means; and
  a controller coupled to the memory means, wherein the controller is configured to:
    cluster one or more key to physical (K2P) entries in a K2P table based on a key value (KV) format of a KV pair data, a size of the KV pair data, a read frequency of the KV pair data, a read likelihood of an another KV pair data to be read after reading the KV pair data, and a relative performance of the KV pair data; and
    prefetch the one or more K2P entries in response to receiving a read command for a K2P entry of the one or more K2P entries.

20. The data storage device of claim 19, wherein the data storage device is dynamic random access memory-less (DRAM-less), and wherein the K2P table is stored in a host memory buffer (HMB) of a host device coupled to the data storage device.

* * * * *